United States Patent [19]

Watari

[11] Patent Number: 4,667,341
[45] Date of Patent: May 19, 1987

[54] CONTINUOUS SPEECH RECOGNITION SYSTEM

[76] Inventor: Masao Watari, c/o Nippon Electric Co., Ltd., 33-1, Shiba Gochome, Minato-ku, Tokyo, Japan

[21] Appl. No.: 462,869

[22] Filed: Feb. 1, 1983

[30] Foreign Application Priority Data

Feb. 1, 1982 [JP] Japan ................................ 57-14528

[51] Int. Cl.$^4$ .............................................. G10L 5/00
[52] U.S. Cl. ........................................ 381/43; 381/41; 364/513.5
[58] Field of Search ........................ 381/41, 42, 43, 44, 381/45, 46, 47, 48, 49, 50; 364/513, 728, 513.5; 382/10, 23, 13, 28

[56] References Cited

U.S. PATENT DOCUMENTS

| | | | |
|---|---|---|---|
| 4,059,725 | 11/1977 | Sakoe | 364/513.5 |
| 4,256,924 | 3/1981 | Sakoe | 364/513 |
| 4,282,403 | 8/1981 | Sakoe | 364/513.5 |
| 4,446,531 | 5/1984 | Tanaka | 364/513.5 |

OTHER PUBLICATIONS

H. Sakoe et al., "Dynamic Programming Algorithm etc." IEEE Trans. Acoustics etc., Feb. 1978, pp. 43–49.
C. Myers et al., "A Level Building Dynamic Time Warping Algorithm etc." IEEE Trans. Acoustics etc., Apr. 1981, pp. 284–297.

Primary Examiner—Gareth D. Shaw
Assistant Examiner—John J. Salotto

[57] ABSTRACT

The probability of false recognition in a continuous speech recognition system is reduced by developing a similarity measure and path information at each time point (i, j), checking whether or not the path information at the time point (i, j) is within a predetermined window restriction, and excluding a time point outside the window restriction from development of the similarity measure and path information.

10 Claims, 15 Drawing Figures

CONTINUOUS SPEECH RECOGNITION SYSTEM

BACKGROUND OF THE INVENTION

This invention relates to a continuous speech recognition system, and more particularly to an improvement thereof for reducing a false recognition due to an unnatural matching path.

A continuous speech recognition system is used for automatically recognizing a speech with two or more continuously spoken words. The pattern matching method for continuous speech recognition has been proposed in the U.S. Pat. No. 4,059,725. This method operates for connecting a plurality of reference word patterns in every order to obtain reference patterns of continuous voice with two or more reference words (hereinafter called "reference continuous voice patterns") and matching the reference continuous voice patterns with the whole input pattern. The recognition is performed by specifying the number and order of the reference word patterns included in the reference continuous voice patterns matched with the input pattern so that a whole similarity measure will be minimized. The above-mentioned minimization is divided practically into two stages, the first being the stage of minimization at word units (hereinafter referred to as "digits") which correspond to the levels of reference words and constituting a reference continuous voice pattern and the second being the stage of minimization as a whole, with each minimization carried out according to dynamic programming (the matching using dynamic programming being called "DP matching" hereinafter).

A technique to reduce the number of times for DP matching has been proposed by Cory S. Myers and Lawrence R. Rabinar. Reference is made to the paper "A Level Building Dynamic Time Warping Algorithm for Connected Word Recognition" IEEE TRANSACTIONS ON ACOUSTICS, SPEECH, AND PROCESSING, VOL. ASSP-29, No. 2, APRIL 1981, pp. 284–297. According to this method (called LB method hereinafter), the similarity measure between the input pattern given in a time series of feature vectors and the reference continuous voice patterns also given in a time series of feature vectors will be obtained. The reference continuous voice patterns are constituted of every connected combination of a plurality of reference word patterns. In the minimization stage at digits, a minimum value of all similarity measures for a certain digit (a certain word unit) obtainable along all matching paths passing a certain point is given generally by the sum of the minimum value of partial similarity measures from the start point for that digit to the certain point and that of partial similarity measures from the certain point to the end. Now, if the end point for that digit is regarded as the mentioned "certain point", the minimum value of the similarity measures for the digits—that digit and the next digit—can be given by the sum of the minimum value of the similarity measures for that digit, i.e. from its start point to its end point (=the certain point in this case) and that of the similarity measures for the next digit, i.e. from the start point (=the certain point) to the end point of the next digit. Thus, the minimum whole similarity measure is obtained by summing the minimum similarity measures for all digits. Namely, possible reference word patterns for the first digit of the reference continuous voice pattern are subjected first to a matching with the input pattern to obtain a minimum value of the similarity measure for the first digit, and then the result works as an initial value for matching of the second digit to carry out a matching of reference word patterns on the second digit with the input pattern. After matching as far as the final digit permitted, a minimum value of the similarity measure for each digit at an end point of the input pattern is obtained, thus obtaining an optimum digit number. A recognition category on each digit is obtained successively by following backwardly the matching path from a point of a similarity measure on the optimum digit.

For the purpose of reducing the number of calculations in the DP matching method and avoiding a false recognition caused by taking an unnatural matching path, a matching window is given, generally as global constraints, limiting the matching path. The matching window is given by two straight lines U (i) and L (i) of fixed inclination which are extended from the origin (the starting time point of the input pattern and the reference pattern) or by a parallelogram whose vertexes are starting and ending points.

To the DP matching method, the matching window is applicable as it is. To the LB method, however, it is not directly applicable since the starting points fixed for each digit are different on each digit. Therefore, in the abovementioned paper by Myers et al., U (i) and L (i) are given by the following expressions.

$$L(i) = \max\left[\frac{i+1}{2}, 2(i-I) + \phi(x)\right] \quad (1)$$

$$U(i) = \min\left[2(i-1) + 1, \frac{1}{2}(i-I) + \phi(X_{max})\right] \quad (2)$$

Here, $\phi(x)$ is the total length of the reference patterns of words recognized up to the $(X-1)$th digit (length of the concatenated super reference patterns). Before the similarity measure at each time point (i, j) is calculated, determination is made as to whether the time point (i, j) is located within the matching window given by the expressions (1) and (2), and the calculation is conducted only for time points located in the matching window. However, since the recognition result up to the $(x-1)$th digit is obtained through the decision processing (back tracking) conducted after the operation up to the final digit is completed, $\phi(x)$ is unknown in the course of the operation. Accordingly, it is necessary to set a large value for $\phi(x)$ and, generally, the length of the reference pattern of the longest word prepared for each digit is inevitably assigned. Namely, $\phi(x)$ for the x-th digit is expressed by $$\phi(x) = x \cdot J_{max} \quad (3)$$

where $J_{max}$ shows the length of a pattern having the maximum length out of a plurality of reference patterns. As a result, a larger value must be set for $\phi(x)$ of a higher digit. Therefore, the difference between $\phi(x)$ and the true total length of the reference patterns is accumulated as the digit approaches the final digit, loosening the restriction by the matching window. Accordingly, the function of global constraints by the matching window is not fulfilled and a false recognition based on taking an unnatural matching path takes place. Especially in the case when numerals are continuously uttered without any restriction of digits, $\phi(x)$ becomes larger with the increase in digits, and thus the aforesaid drawback becomes more pronounced.

The following is an example of false recognition due to an unnatural matching path. When a certain sound element is uttered continuously over two words, the continuously uttered sound section may be recognized to be a single sound element, and therefore a sound element or a word may be omitted from the recognition result. In this case, the matching path is extended almost horizontally in the direction of the time axis of an input pattern. This means that the conventional loose window restriction allows such an unnatural matching path. To the contrary, it can also happen that a sound element, though being one sound element originally, comes into matching with a section comprised of a continuously spoken sound elements of reference pattern (i.e. the insertion of the sound element or the word). In this case, the matching path is nearly parallel to the time axis of the reference pattern, leading to false recognition.

SUMMARY OF THE INVENTION

An object of the present invention is to provide a continuous speech recognition system which enables a global constraint to inhibit the unnatural matching path thereby reducing the chances of a false recognition.

Another object of the present invention is to provide a continuous speech recognition system which can give an appropriate global constraint irrespective of the available number of digits.

Still another object of the present invention is to provide a continuous speech recognition system which can reduce a recognition response time by enabling DP matching processing synchronously with the input speech to be recognized.

Yet another object of the present invention is to provide a continuous speech recognition system which can remove the restriction to the digit number of input words to be recognized.

According to one aspect of the present invention, there is provided a continuous speech recognition system comprising, means for developing a similarity measure and a path information at each time point (i, j) in the order of monotonous increase of i and j based on the similarity measure and path information obtained up to the time point (i, j) by making use of Dynamic Programming, i and j designating time points at the time axes of an input pattern and a continuous reference pattern, respectively, the input pattern being given in a time series of feature vectors for an input speech, the continuous reference pattern being given in a time series of feature vectors for connected combinations of a plurality of reference word patterns, the similarity measure being given by an accumulated distance between the feature vectors of the input pattern and the reference word patterns, and the path information representing a start time point of a word unit of the continuous reference pattern, means for setting the minimum similarity measure obtained for a word unit as an initial value for a next subsequent word unit, means for checking whether or not the path information at the time point (i,j) is within a predetermined window restriction, means for excluding a time point outside the window restriction from development of the similarity measure and path information, and means for deciding recognition results of the input speech on the basis of the matching path showing the minimum similarity measure at the end time point of the input pattern.

Other purposes and characteristic features of the present invention will be made clear by the following explanations with reference to drawings.

DETAILED DESCRIPTION OF THE PREFERRED EMBODIMENTS

As stated above, the conventional window restriction in the LB method gives an upper boundary U (i) and a lower boundary L (i) formed by straight lines (inclinations of 2 and $\frac{1}{2}$, respectively) on an i-j coordinate plane formed by an input pattern axis (i-axis) and a reference pattern axis (j-axis), and it becomes looser with higher digits. Therefore, it allows an unnatural matching path, causing a false recognition.

Figure 1:
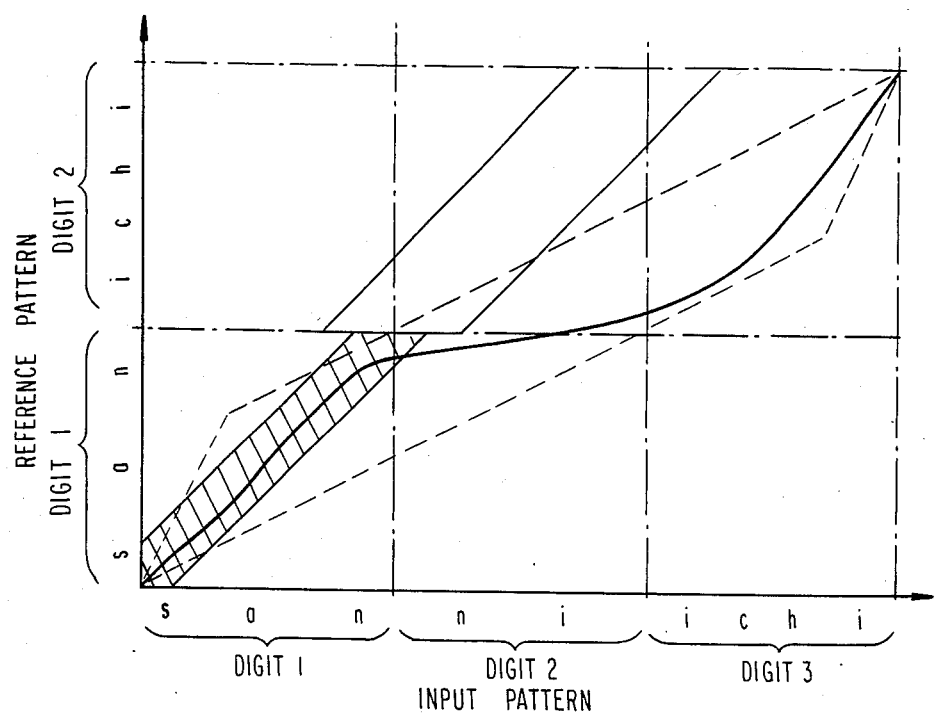
FIG. 1 is a drawing showing the difference between the window restriction of the present invention and the conventional ones.

FIG. 1 shows a typical example wherein the conventional window restriction allows an unnatural matching path. In this example, input spoken words are constituted by three words (three digits). The first digit is a Japanese word "san" (three, in English), the second digit is a Japanese word "ni" (two, in English), and the third digit is a Japanese word "ichi" (one, in English). In these words, the sound element "n" of the ending of the first digit is similar phonetically to the sound element "n" of the starting of the second digit, and, in the same way, the sound element "i" of the ending of the second digit is similar phonetically to the sound element "i" of the starting of the third digit. When these three words are generated continuously, the sound element of the starting of the second digit can be absorbed in the sound element of the ending of the first digit and the sound element of the ending of the second digit can be absorbed in that of the starting of the third digit. Accordingly, the words are falsely decided to be two words of which the first digit is "san" and the second digit is "ichi", and thus one word "ni" is omitted from the recognition result. As shown in FIG. 1, the matching path becomes a nearly horizontal straight line, in the vicinity of the time point of a concatenated part of the first digit "san" and the second digit "ichi". Such a matching path is unnatural and causes a false recognition. Since the conventional window restriction is given, for example, by boundaries in the shape of a parallelogram as shown by broken lines in FIG. 1, it is clear that the above-mentioned unnatural path can not be removed.

In the LB method, the start point on the i-j coordinate plane is determined for each digit and is retained as a path information H (i, j) in the similarity measure calculation by making use of DP matching at each time point within that digit. The path information H(i,j) at the time point (i,j) indicates the time point where the matching path retracing from the time point (i,j) intersects the input pattern axis at an initial time point of each reference word (i.e., each digit). Taking the foregoing into consideration, the present invention judges whether or not the path information H (i, j) is located within a predetermined matching window prior to the execution of processing at the time point (i, j). Namely, the window restriction according to the present invention never loosens for a higher digit, because the matching window is set on the basis of each starting point fixed for each digit.

Figure 2A:
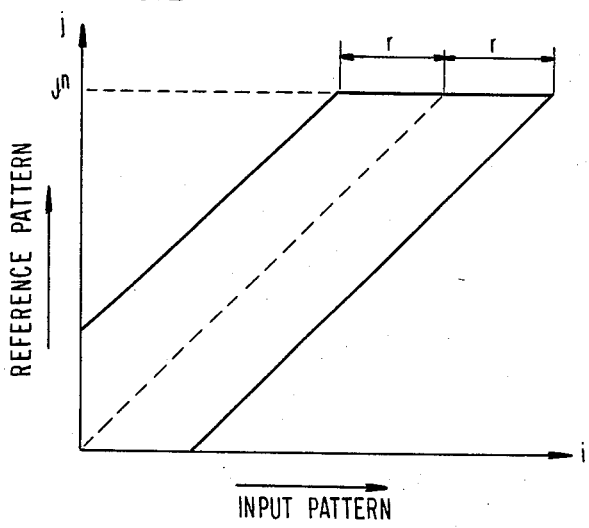
FIGS. 2A and 2B are drawings for explaining the principle of the present invention.

For a more detailed description, the matching window restriction, for example, defined by the following expressions will be explained. These expressions have been proposed by Sakoe et al. in a paper "Dynamic Programming Algorithm Optimization for Spoken Word Recognition", IEEE TRANSACTIONS ON ACOUSTICS, SPEECH, AND SIGNAL PROCESSING, VOL. ASSP-26, No. 1, FEBRUARY 1978.

$$j-r \leq i \leq j+r \qquad (4)$$

where r is a constant determined on the basis of the time variation of the speech. The width of the matching window is expressed as (2r+1) as shown in FIG. 2A.

Figure 2B:
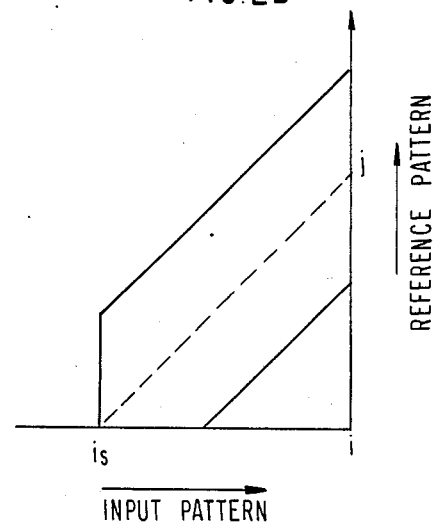

Now, let the start time point be $i_s$, the range of j allowed at a time point i is defined by the following expression, as shown in FIG. 2B.

$$i-i_s-r \leq j \leq i-i_s+r \qquad (5)$$

The following expression (6) defining the range of the start point allowed is easily obtained from the expression (5).

$$i-j-r \leq i_s \leq i-j+r \qquad (6)$$

As is clearly seen from the foregoing, two kinds of window restriction concepts are proposed. The first concept concerns the time point restriction and is determined based on the path information, i.e., based on the starting point $i_s$, according to Equation (5), as shown in FIG. 2B. The second concept concerns a restriction range on the path information itself, with the window restriction for each start point being determined based on each time point (i,j) according to Equation (6). It will be easily understood that the first and second window restriction concepts are the same in principle, since Equations (5) and (6) are interchangeable with one another.

As will be stated later, the path information H (i, j) is a path information H (i−1, j') at a time point (i−1, j') with the minimum similarity measure selected from among these at time points (i−1, j−2), (i−1, j−1) and (i−1, j) employed in the asymptotic calculation to develope the similarity measure at a time point (i, j). Accordingly, the path information H (i−1, j') at the time point (i, j) is compared with i−j−r and i−j+r. When $$H(i-1,j') < i-j-r$$

or $$H(i-1,j') > i-j+r \qquad (7)$$

the pass information H (i−1, j') is decided to be located outside the range of the matching window, this time point (i−1, j') is excluded from the object path to be based on. For this, it suffices that the point is simply placed out of the object path or that the similarity measure of the point is set to be infinity, that is, G (i−1, j')= ∞.

Figure 3:
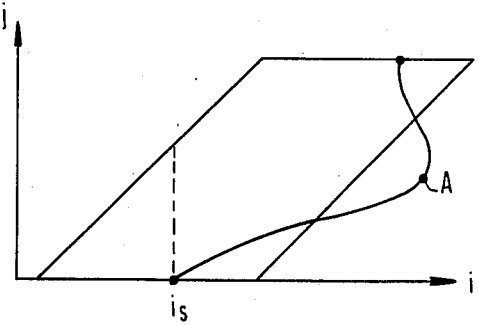
FIG. 3 is a drawing illustrating one example of the concrete effect of the present invention.

According to the present invention, a path information (start point) is monitored at each time point (i, j) as to whether it is within the window restriction range or not, as described above. FIG. 3 shows an example wherein mismatching based on the unnatural matching path is avoided according to the first window restriction concept of the present invention. In FIG. 3, it is judged or checked whether each time point (i,j) is within a parallelogram window restriction which is determined on the basis of the path information, i.e., on the basis of the matching path up to that time point (i,j). A time point A in FIG. 3 is judged to be outside the window restriction. Therefore, the matching path as shown in FIG. 3, which once goes out of the window restriction range and comes back again into the window, can be excluded as an inappropriate one. Moreover, when the unnatural matching path as shown in FIG. 1 is taken, it can also be excluded. In FIG. 1, the window restriction range determined by the start time point on the first digit is given by the shaded portion. Since the start time point $i_s$ (path information) of the unnatural matching path extended in the horizontal direction is to be located outside the window range in the vicinity of the end of the first digit of the reference pattern, this unnatural matching path is excluded from the object for the estimation of the DP process, reducing such a false recognition remarkably. The different window restriction can be given for each digit or for each start time point on each digit in accordance with the spoken condition or circumstances.

The present invention is entirely applicable to the LB method. Therefore, it is also applicable to the aforesaid method proposed by Myers et al. The following is an explanation of a representative example of the present invention which is capable of reducing a recognition response time and is excellent in the real-time property. The fundamental idea of this example has been proposed earlier by the present inventor (U.S. Ser. No. 447,829).

The principle of the operation and the concrete constitution proposed in the embodiment will be explained hereunder.

The abscissa axis indicates a time point i of an input pattern A, and a feature vector (consisting of feature parameters of W) $a_i$ at the time point i from a start 1 of speech to an end I is expressed by $$a_i = a_{i1}, a_{i2}, \ldots, a_{iw}, \ldots, a_{iW} \qquad (8)$$

where $a_{iw}$ denotes the w-th feature parameter constituting $a_i$. Then, the ordinate indicates a time point j of a reference continuous voice pattern B. Each digit corresponds to each reference word of the words to be recognized, and a time length of each digit varies according to the length of the reference word. Assuming the n-th reference word is denoted as $B^n$, the time points of the reference word $B^n$ include time points from a start point $j=1$ of the digit to an end point determined on the length of the reference word $B^n$. Therefore, the feature vector (consisting of feature parameters of W) at the time point j of the reference word $B^n$ on a digit is expressed, as in the case of $b_j$, by the following:

$$j^n = b_{j1}{}^n, b_{j2}{}^n, \ldots b_{jw}{}^n, \ldots, b_{jw}{}^n \tag{9}$$

Then, a distance d (i, j) between a feature vector $a\textbackslash_i$ at the time point i of an input pattern and a feature vector $b_j{}^n$ at the time point j of the reference pattern of the n-th word on a digit is defined by $$d(i,j) = \text{distance } (a\textbackslash_i, b_j{}^n) \tag{10}$$

$$= \sum_{w=1}^{W} a_{iw} - b_{iw}^n.$$

The time points i and j are further made to correspond to each other by a time normalized function, and the cumulative sum of the distance d (i, j) between feature vectors at the time points thus made corresponding to each other along the time normalized function is defined as a similarity measure G (i, j). The similarity measure is calculated asymptotically as $$G(i, j) = d(i, j) + G(i-1, \hat{j}) \tag{11}$$

where $$\hat{j} = \text{argmin } G(i-1, j') \tag{12}$$

$$j-2 \leq j' \leq j$$

where argmin y means x with y minimized under the condition $x \epsilon X$, and $\hat{j}$ refers to j' with G (i−1, j') minimized under $j-2 \leq j' \leq j$. In other words, the expression (11) indicates that a path in which the similarity measure will be minimized is selected from among the three paths from each point of (i−1, j), (i−1, j−1) and (i−1, j−2) to point (i, j). The path in which the minimum value G (i−1, $\hat{j}$) used for obtaining the similarity measure G (i, j) is selected is called a matching path, and the path information H (i, j) indicating this path is defined by $$H(i, j) = H(i-1, \hat{j}) \tag{13}$$

It should be noted that the similarity measure at the time point i of the input pattern is ready for calculation if a similarity measure at the time point i−1 has been calculated, since a path for DP matching is incremented monotonously. Reduction of the lag in recognition response time and processing synchronously with a speech input may be attained by carrying out the calculation of the similarity measure in a string vertically along a time axis of the reference pattern. The similarity measure is calculated in a string vertically including each digit and parallel with the j axis, however, the following parameters will be defined prior to giving a description thereof.

G (x, n, j) is an accumulated distance as far as the time point j of a reference pattern of the n-th word on the x-th digit, which is called similarity measure; H (x, n, j) is a start point of the path taken until the similarity measure G (x, n, j) at the time point j of the reference pattern of the n-th word on the x-th digit is obtained, indicating a time point of the input pattern at time point 1 of the reference pattern on the x-th digit, which is called a path information; T (x, i) is a minimum value of similarity measures G (x, n, $j^n$) obtained through calculation as far as an end point $J^n$ for each of the reference patterns of all the words at the time point i, which is called a digit similarity measure; L (x, i) indicates a path information corresponding to the similarity measure G (x, n, $J^n$) of the digit similarity measure T (x, i), which is called a digit path information; N (x, i) indicates a category to which a word of the reference pattern used when the digit similarity measure T (x, i) is obtained belongs, which is called a digit recognition category; and R (x) is a recognized result of the x-th digit.

As an initial value a digit similarity measure T (x−1, i−1) and a similarity measure G (i−1, j) at a point i−1 on each digit are necessary for calculation of the similarity measure in a string vertically including all digits, which are obtained through calculation at the point i−1. It is noted here that the similarity measure G (i−1, j) and the path information H (i−1, j) at the time point i−1 for each digit x and each word n should be stored. The similarity measure G (i−1, j) and the path information H (i−1, j) of the word n on the digit x are given by G (x, n, j) and H (x, n, j) respectively.

For similarity measure calculation, an asymptotic calculation for dynamic programming will be performed in the order of each time point i along the time axis of an input pattern in the matching window region between the upper boundary U (i) and the lower boundary L (i). U (i) and L (i) are determined based on the window restriction expressed by equations (4) and (5) on x-th digit as follows:

$$U(i) = \min \{i - J_{min} \cdot (x-1) + r \cdot x, J_{max}\}$$

$$L(i) = \max \{i - J_{max} \cdot (x-1) - r \cdot x, 1\}$$

where $J_{min}$ and $J_{max}$ denote the minimum and maximum length values of the reference patterns. Initial conditions for the similarity measure calculation will be given by $$G(x, n, j) = \infty \tag{14}$$

$$x = 1 \sim X_{max}, n-1 \sim N, j = 1 \sim J^n$$

$$T(x, i) = \infty \tag{15}$$

$$x = 0 \sim X_{max}, i = 0 \sim I$$

$$T(0, 0) = 0 \tag{16}$$

The similarity measure calculation in a string vertically and parallel with the j axis at the time point i will be performed as follows. First, a vector distance between the feature vectors $a\textbackslash_i$ and $b_j{}^n$ at the time point i on the x-th digit is calculated according to the expression (10). Then follows a calculation of the similarity measure in a string vertically on each digit with the values initialized as $$G(x, n, 0) = T(x-1, i-1) \tag{17}$$

$$H(x, n, 0) = i-1 \tag{18}$$

Next, prior to a similarity measure calculation according to an asymptotic formula, the appropriateness of a matching path is judged on the basis of the expressions (7). That is, whether or not the path information at a time point (i, j) is within the window restriction shown by the expression (7) is judged on the basis of the time points, i, j and r, and the similarity measure at the time point where the path information is outside the window restriction is set to be infinity.

For example, when a path information H (x, n, j') within the range of $j-2 \leq j' \leq j$ is outside the window restriction, the other similarity measure GR (j') at that time point is defined as $$GR(j') = \infty \qquad (19)$$

Meanwhile, when the information H (x, n, j') is within the window restriction, the similarity measure at the time point is expressed as $$GR(j') = G(x, n, j') \qquad (20)$$

Thereafter, the similarity measure and the path information are developed according to the following asymptotic expression.

$$j = \text{argmin } \{GR(j')\} \qquad (21)$$

$$j-2 \leq j' \leq j$$

$$G(x, n, j) = d(j) + GR(j) \qquad (22)$$

$$H(x, n, j) = H(x, n, j) \qquad (23)$$

As is apparent from expressions (21), (22) and (23), the calculation at the time point (i, j) is obtainable from the similarity measure at the three points (i−1, j), (i−1, j−1), (i−1, j−2). Then, the calculation at the time point (i, j−1) can be obtained from the similarity measure at the three time points (i−1, j−1), (i−1, j−2), (i−1, j−3) and the similarity measure at the point (i−1, j) is not used therefor. Hence no influence will be exerted on a calculation at the time point (i, j−1) by storing a calculated result at the time point (i, j) to the time point (i−1, j). Therefore the calculation of the similarity measure in the direction to decrease j, makes it possible to use a storage area in common for the similarity measure at time point i−1 and the similarity measure at time point i, thus saving memory capacity.

After carrying out the above calculations in a string vertically, the similarity measure G (x, n, $J^n$) at an end $J^n$ of the reference word pattern of each word n on each digit is compared with the digit similarity measure T (x, i), which is a minimum word similarity measure on the digit calculated so far, and when G (x, n, $J^n$) is less than T (x, i) the similarity measure G (x, n, $J^n$) is decided to be the digit similarity measure T (x, i) a category n to which the reference word pattern belongs; a digit recognition category N (x, i), and a matching path information H (x, n, $J^n$) through which the similarity measure G (x, n, $J^n$) is obtained; and a digit path information L (x, i).

Namely, where
T (x, i) > G (x, n, $J^n$),
then $$T(x, i) - G(x, n, J^n) \qquad (24)$$

$$N(x, i) = n \qquad (25)$$

$$L(x, i) = H(x, n, J^n) \qquad (26)$$

The similarity measure thus obtained in a string vertically is calculated for V reference word patterns.

The calculation of the similarity measure in a string vertically is carried out similarly for each of the reference word patterns of V with the time point i of the input pattern increased by one, which proceeds as far as the end point I of the input pattern.

Finally, a recognition decision on the input pattern is made according to the digit path information L (x, i) and the digit recognition category N (x, i). The method of this decision comprises, as described in the paper by Myers et al., obtaining a minimum value of the digit similarity measure T (x, I) on each digit at the end time point I of the input pattern in the digits permitted, i.e. from $X_{min}$-th digit to the $X_{max}$-th digit, and a digit x whereat the minimum value is obtained as a digit number of the input pattern. Further, a recognized result R (X) on the X-th digit is obtained from N (X, I), and an end time point of the (X−1)th digit is obtained from a digit path information L (X, I). A recognized result R (x) is then obtainable at each digit through repeating the above operation by turns.

Namely, the digit number X of the input pattern is obtained from the following:

$$X = \text{argmin } [T(x, I)] \qquad (27)$$

$$X_{min} \leq x \leq X_{max}$$

Then, the recognized result R (X) on the X-th digit is obtained from $$R(X) = N(X, I) \qquad (28)$$

and the end time point I of the (X−1)th digit is obtained from $$i = L(X, I) \qquad (29)$$

Generally, the recognized result R (x) on the x-th digit and the end time point i of the (x−1)th digit are obtained from $$R(x) - N(x, i) \qquad (30)$$

$$i = L(x, i) \qquad (31)$$

and words of all the digits are finally recognized.

Figure 4:
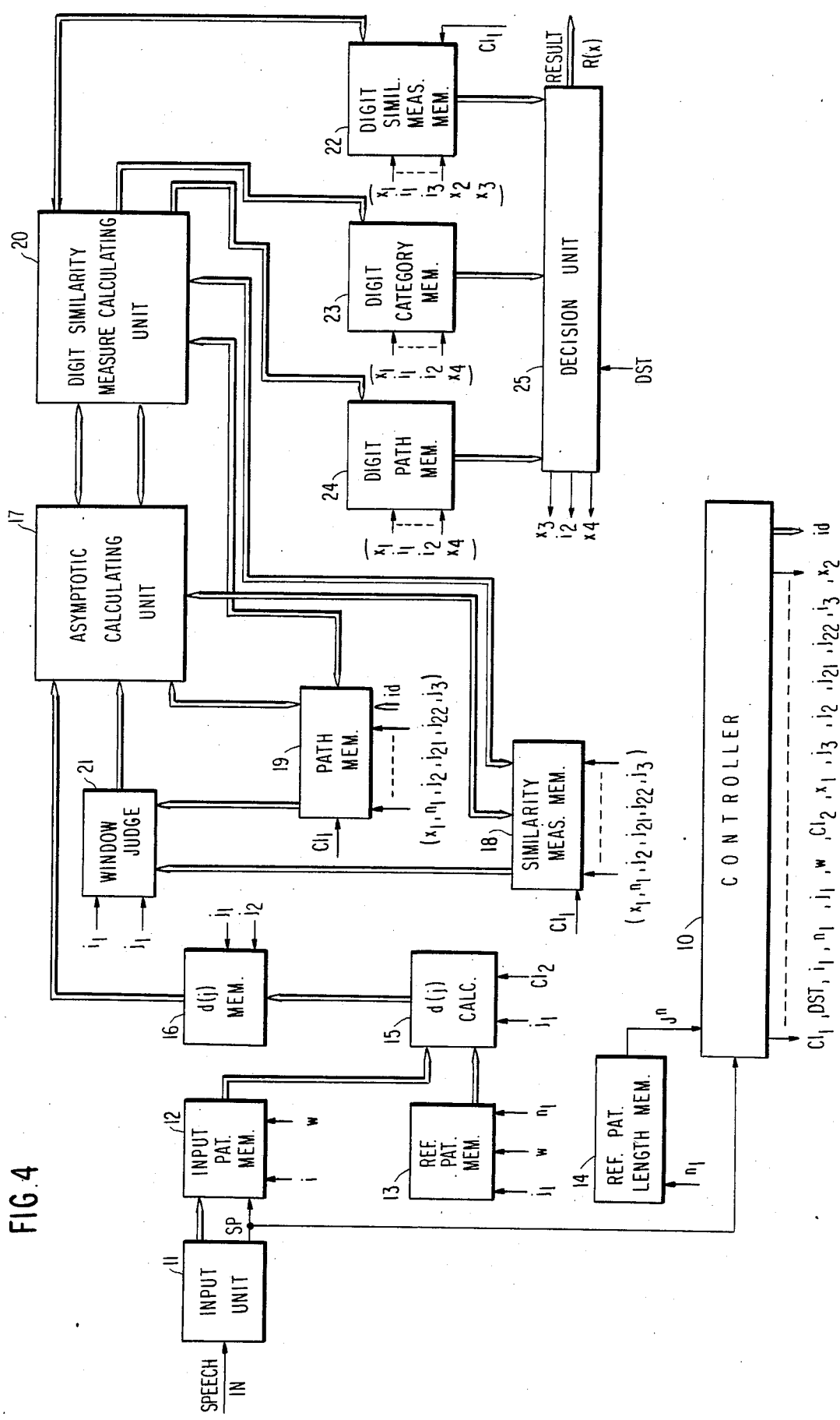
FIG. 4 is a structural block diagram of the continuous speech recognition system according to one embodiment of the present invention.
Figure 5:
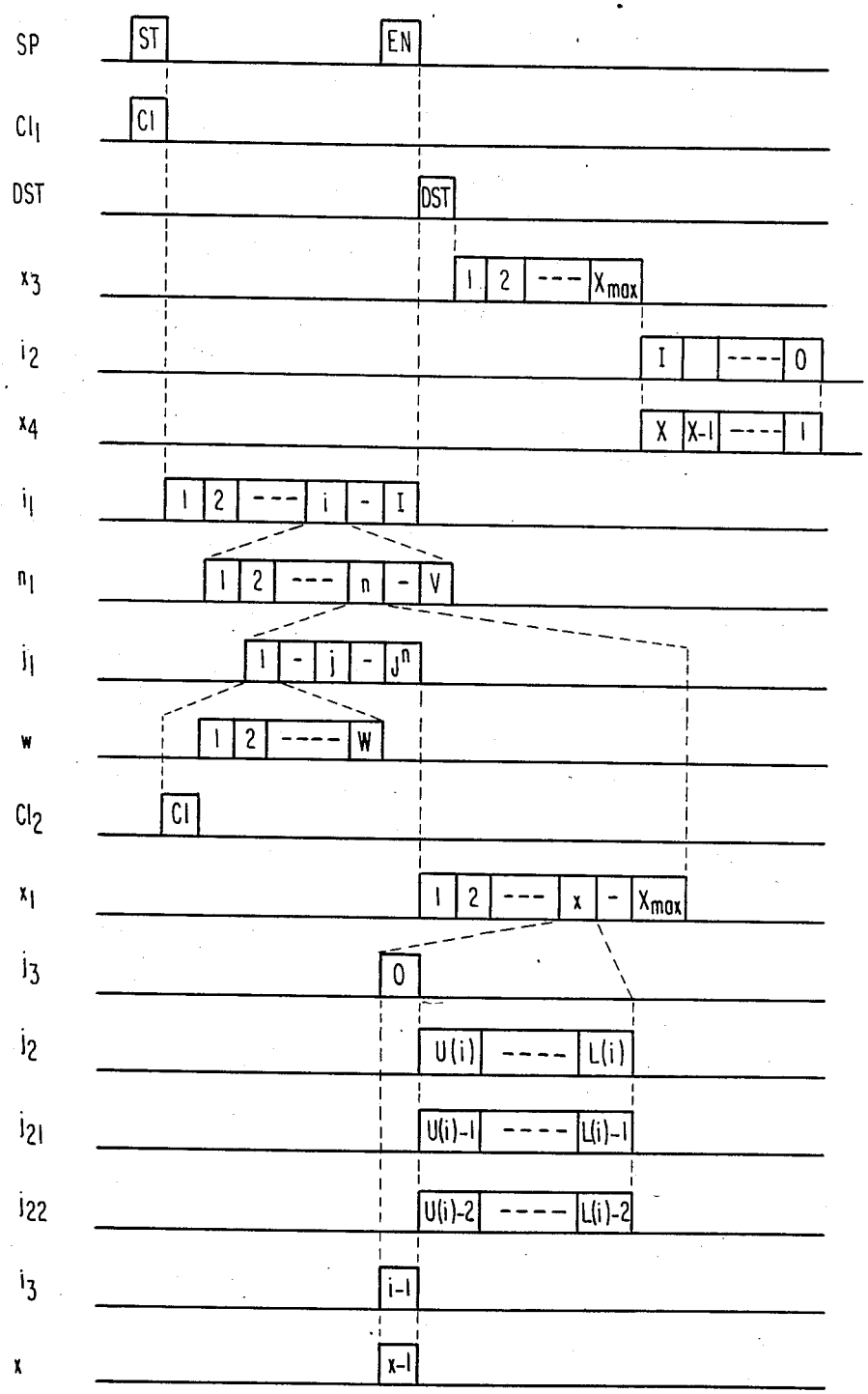
FIG. 5 is a timing chart of signals of each unit in FIG. 4.

Now, a constitution of the system according to the present invention will be described with reference to the accompanying drawings. FIG. 4 is a block diagram representing an embodiment of this invention; and FIG. 5 is a time chart of control command signals on each part given in FIG. 4. A control unit 10 has a function to control other units by control command signals $Cl_1$, DST, $i_1$, $n_1$, $j_1$, w, $Cl_2$, $x_1$, $j_3$, $j_2$, $j_{21}$, $j_{22}$, $i_3$, $x_2$, etc. as shown in FIG. 5, and a detailed description will be given thereof in conjunction with the operation of other units.

An input unit 11 analyzes an input speech given by a signal SPEECH IN and outputs a feature vector $a_i$ consisting of a time series of feature parameters of W shown in the expression (8) at a constant interval (frame). The speech analysis begins, for example, with a frequency analysis by a filter bank constituted of a multi-channel (W-channel) filter. Then, the input unit 11 monitors a level of the input speech, detects the start and end of the speech, and sends a signal ST indicating the start and a signal EN indicating the end, as a signal SP to the control unit 10 and to an input pattern memory 12.

After receipt of the SP signal, the feature vector $a_i$, given by the input unit 11 in accordance with the signal $i_1$ (indicating from 1 to the end time point I) designating a time point of the input pattern supplied from the control unit 10, is stored in the input pattern memory 12.

Reference words of V predetermined as words to be recognized, are analyzed to obtain a feature vector consisting of feature parameters of W shown in the expression (9) at each time point (frame). Thus obtained 1st to V-th reference word patterns $B^1, B^2, \ldots B^V$ (each pattern being given in a time series of feature vectors) are stored in a reference pattern memory 13. A length $J^n$ of the reference patterns $B^n$ of the n-th word is stored in a reference pattern length memory 14.

A signal $n_1$ from the control unit 10 specifies the n-th reference word and indicates a category to which the reference word belongs. The length $J^n$ of the reference word pattern $B^n$ of the specified reference word is read out of the reference pattern length memory 14 in response to the signal $n_1$. After receipt of the $J^n$ signal, the control unit 10 generates a signal $(1 \sim J^n)$ corresponding to the time point j of the reference word pattern.

From the input pattern memory 12 the w-th feature parameter $a_{iw}$ of the feature vector $a_i$ corresponding to the time point of the signal $i_1$ is supplied to a distance calculating unit 15 in response to signals $i_1$ and w from the control unit 10. On the other hand, the w-th feature parameter $b_{jw}^n$ of the feature vector $j^n$ $(n=1 \sim J^n)$ at a time point $j_1$ of the n-th reference word pattern is read out of the reference pattern memory 13 after having received signals $n_1, j_1$ and w and is sent to the distance calculating unit 15.

Figure 6:
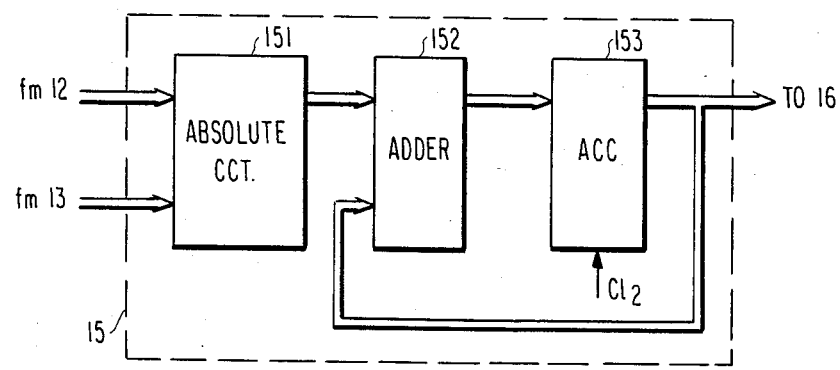
FIG. 6 is a detailed structural block diagram of a distance calculation unit in FIG. 4.

Upon receipt of $a_{iw}$ and $b_{jw}^n$, the distance calculating unit 15 calculates the distance d (i, j) defined by the expression (10). Since the calculation according to the present invention is carried out in a string vertically, i is handled as fixed, d (i, j) can be expressed as d (j), and thus d (j) is obtained at the time points $j=1, 2, \ldots, J^n$ for each digit and stored in a distance memory 16. An example of the constitution of the distance calculating unit 15 is shown in FIG. 6. After reception of the signal SP indicating the start time point of the input speech, the content stored in an accumulator 153 is cleared according to a clear signal $Cl_2$ generated from the control unit 10 for each j at i. An absolute value circuit 151 provides an absolute value $|a_{iw} - b_{jw}^n|$ of the difference between feature parameters $a_{iw}$ and $b_{jw}^n$ sent from the input pattern memory 12 and the reference pattern memory 13, and the result is supplied to one input terminal of an adder 152. An adder output is stored in the accumulator 153. An output terminal of the accumulator 153 is connected to the other input terminal of the adder 152, and d (j) of the expression (10) is obtained finally as an output of the accumulator 153 by changing the signal w from 1 to W. The distance d (j) thus obtained is stored in the distance memory 16 with its address specified at $j_1$.

Initialization of the similarity measure and the digit similarity measure which is necessary for the asymptotic calculation of similarity measures is carried out by the signal $Cl_1$ from the control unit 10 before the speech is inputted, and the values given by the expressions (14), (15) and (16) are set in a similarity measure memory 18 and a digit similarity measure memory 22.

Figure 7:
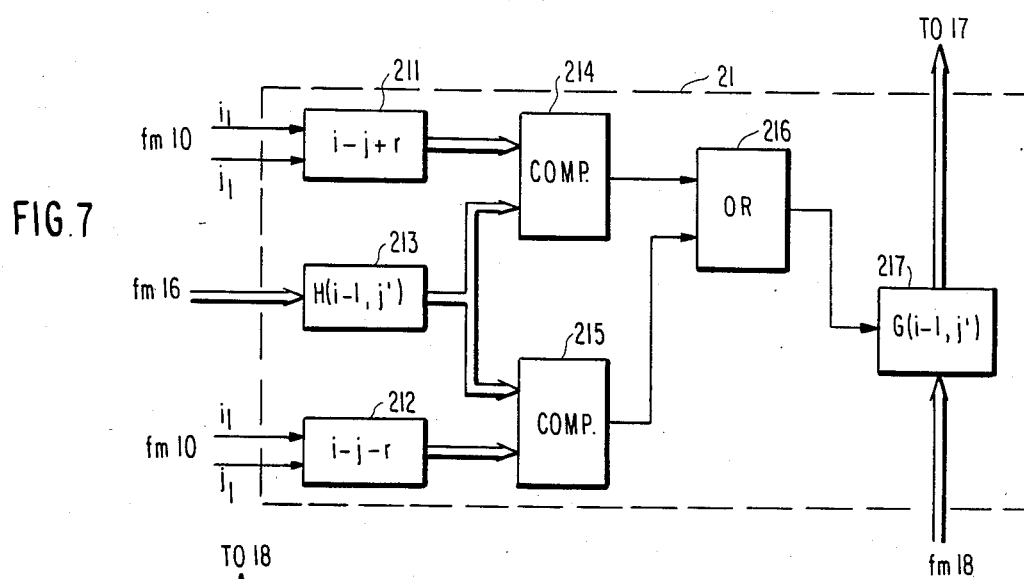
FIG. 7 is a detailed structural block diagram of a window restriction unit in FIG. 4.

A window restriction unit 21 checks whether or not the path information is within the window restriction based on the expression (7) and executing the expressions (19) to (23), and, as shown in FIG. 7, is constituted by a register 211 retaining $i-j+r$ indicating the upper boundary of the window, a register 212 retaining $i-j-r$ indicating the lower boundary thereof, a register 213 retaining the path information H $(i-1, j')$, a comparing circuit 214 comparing the retained value in the register 211 with that in the register 213, a comparing circuit 215 comparing the retained value in the register 212 with that in the register 213, an OR circuit 216, and a register 217 retaining an accumulated distance G $(i-1, j')$. The path information H $(i-1, j')$ specified sequentially by the control unit 10 is set in the register 213, and is compared with $i-j+r$ and $i-j-r$. When H $(i-1, j')$ is greater than $i-j+r$, or smaller than $i-j-r$, a signal "1" is outputted from the comparing circuit 214 or 215. Output signals from the comparing circuits 214 and 215 are fed to the OR circuit 216 the output of which is supplied to the accumulated distance register 217. The accumulated distance G $(i-1, j')$ specified by the control unit 10 is retained in the accumulated distance register 217, and remains as it is when a signal "0" is given from the OR circuit 216, while infinity is set therefor when the signal "1" is given. The information stored in the accumulated distance register 217 is outputted to the asymptotic calculating unit 17.

Figure 8:
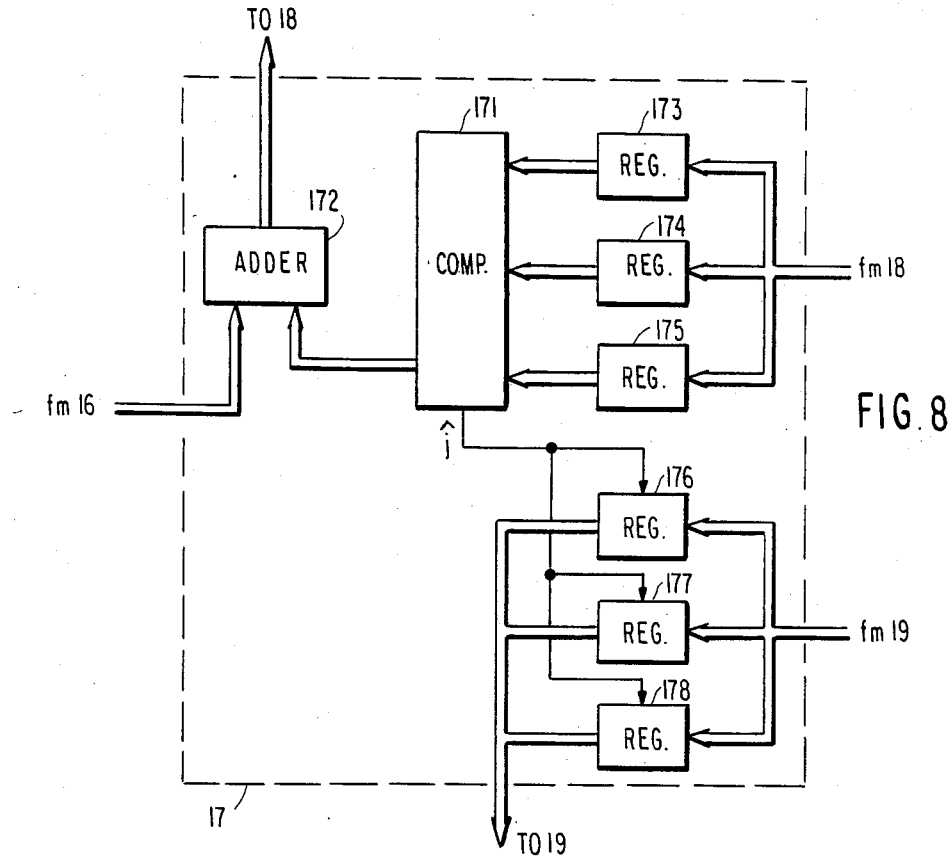
FIG. 8 is a detailed structural block diagram of an asymptotic calculation unit in FIG. 4.

The asymptotic calculating unit 17 computes the similarity measure G (x, n, j) and the path information H (x, n, j) through the computation of the expressions (21), (22) and (23). To save a memory capacity for the similarity measure and the path information, as described hereinbefore, the time point of a reference pattern will be decreased by one from the upper boundary U (i) of the matching window to the lower boundary L (i). A signal $j_2$ is used for this control of the time point. The distance stored at an address $j_2$ is read out of the distance memory in response to the signal $j_2$ from the control unit 10. The asymptotic calculating unit 17 is constituted of three similarity measure registers 173, 174, 175, a comparator 171, an adder 172, and three path registers 176, 177, 178, as shown in FIG. 8. Similarity measures G (x, n, j), G (x, n, j-1), G (x, n, j-2) and path information H (x, n, j), H (x, n, j-1), H (x, n, j-2), specified by the signals $j_2, j_{21}$ and $j_{22}$ indicating the time point of a reference pattern, the time points one and two previous to the time point of the signal $j_2$, are stored in the similarity measure registers $171 \sim 173$ and the path registers $176 \sim 178$, respectively. The comparator 171 detects a minimum value from the three similarity measure registers 173, 174, 175 and issues a gate signal j for selecting a path register corresponding to a similarity measure register from which the minimum value has been obtained. A content of the path register selected by the gate signal j is stored in H (x, n, i) of a path memory 19. Then, the minimum value G (x, n, j) of the similarity measure outputted from the comparator 171 is added with the distance d (j) read out of the distance memory 16 in the adder 172 and the sum is stored in the similarity measure memory 18 as G (x, n, j).

The asymptotic calculation is performed with the time point from U (i) to L (i) in response to the signal $j_2$, and the word similarity measure G (x, n, $J^n$) is computed for each n on each x.

A digit similarity measure calculating unit 20 performs the processes of the expressions (24), (25), (26) and obtains, one after another, minimum values of word similarity measures $G(x, n, j)$ of V which are obtained for each of the words of V on each digit.

Figure 9:
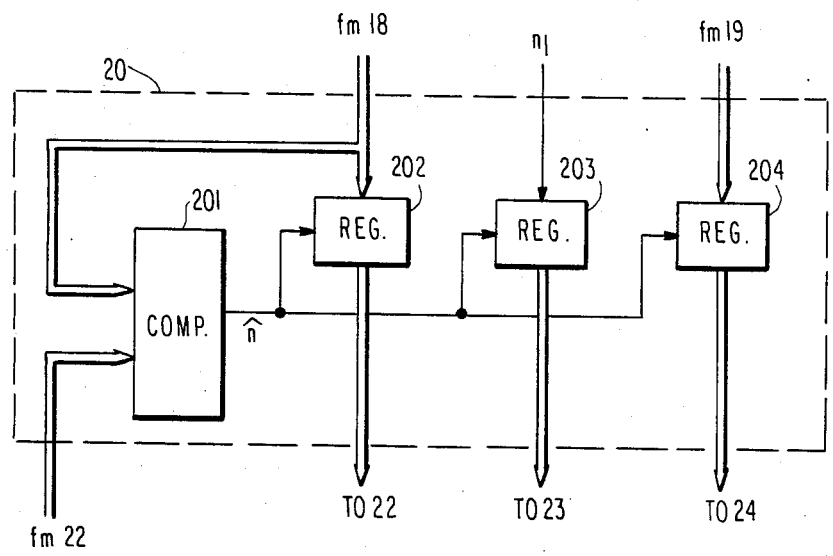
FIG. 9 is a detailed structural block diagram of a digit similarity measure calculation unit in FIG. 4.

As shown in FIG. 9, the digit similarity calculating unit 20 is constituted of a comparator 201, a register 202 to hold the word similarity measure $G(x, n, J^n)$, a register 203 to hold the category n indicating the signal $n_1$ to which a reference word pattern belongs, and a register 204 to hold the path information $H(x, n, J^n)$. The signal $L_1$ specifies the digit of a reference continuous speech pattern, ranging to $X_{max}$ for each of the signal $x_1$. The world similarity measure $G(x, n, J^n)$ and the word path information $H(x, n, J^n)$ are read out of the similarity measure memory 18 and the path memory 19 according to the signal $x_1$ generated from the control unit 10, are then stored in the registers 202 and 204, respectively, and the category n is stored in the register 203. The comparator 201 compares the above word similarity measure $G(x, n, J^n)$ with the digit similarity measure $T(x, i)$ read out of the digit similarity measure memory 22, and when $G(x, n, J^n)$ is less than $T(x, i)$, generates a gate signal n. The word similarity measure $G(x, n, J^n)$, the category n and the word path information $H(x, n, J^n)$ held in the registers 202, 203, 204, respectively, are stored in the digit similarity measure memory 22 as $T(x, i)$, in the digit recognition category memory 23 as $N(x, i)$, and in the digit path memory 24 as $L(x, i)$ respectively, in response to the gate signal n.

Further, signals $j_3$, $i_3$ and $x_2$ indicating the time point 1 of a reference pattern, the time point i-1 one previous to the time point i of the input pattern specified by a signal $i_1$, and the digit one previous to that specified by the signal $x_1$, respectively, are generated from the control unit 10. An initialization for the similarity measure calculation in a string vertically as shown in the expressions (17), (18) is carried out according to those signals. Namely, a digit similarity measure $T(x-1, i-1)$ specified by the signals $x_2$ and $i_3$ is read out of the digit similarity measure memory 22 and stored in the similarity measure memory 18 at the address specified by the signals $x_1$, $n_1$, $j_3$ as $G(x, n, 0)$. Then, a signal $i_d$ indicating an address specified by the signal $i_3$ is supplied to the path information memory 19 from the control unit 10, and value $(i-1)$ specified by the signal $i_d$ is stored in the path memory 19 as $H(x, n, 0)$ at the address specified by the signals $x_1$, $n_1$, $j_3$.

Figure 10:
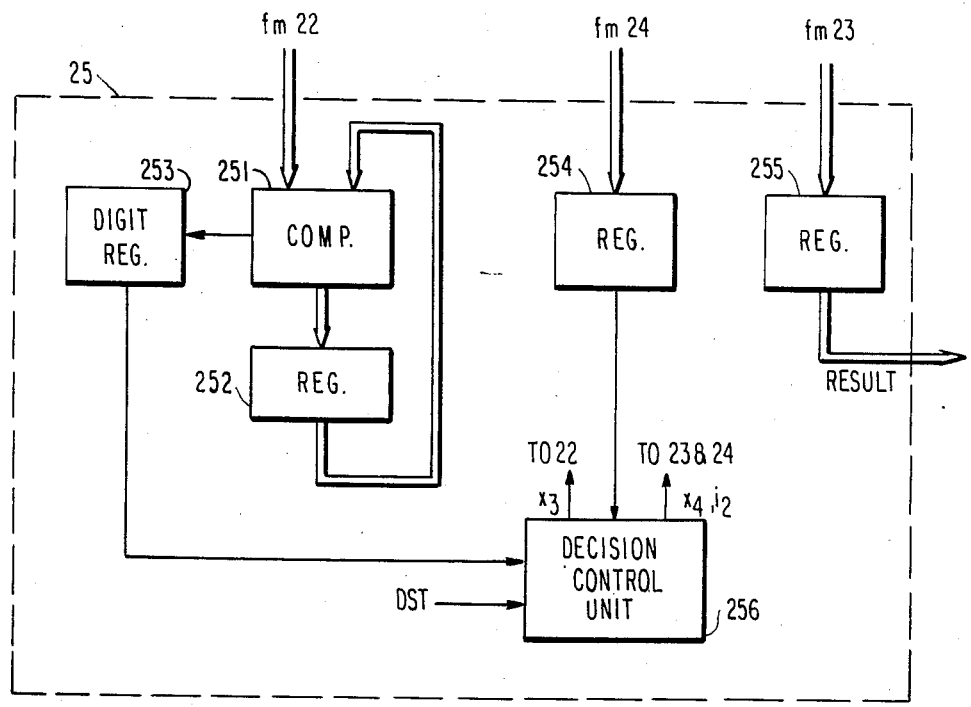
FIG. 10 is a detailed structural block diagram of a decision unit in FIG. 4.

A decision unit 25 carries out the decision processing shown in the expressions $(27) \sim (31)$ and outputs a recognized result $R(x)$ for each digit of the input pattern based on the digit path information $L(x, i)$ and the digit recognition category $N(x, i)$. In detail, as shown in FIG. 10, the decision unit 25 is constituted of a comparator 251, a register 252 to retain a minimum digit similarity measure, a register 253 to retain a digit number, a register 254 to retain the digit path information, a register 255 to retain a recognized result, and a decision control unit 256. When the end of the speech is detected by the input unit 11, in response to the signal SP, the control unit 10 supplies a signal DST for starting the above decision processing to the decision unit 25. After receipt of the signal DST, the decision control unit 256 issues a signal $x_3$ indicating the digit to the digit similarity measure memory 22. The digit similarity measures $T(x, I)$ on each digit of the first to the $X_{max}$-th digit at the end time point I of the input pattern are read out sequentially from the digit similarity measure memory 22 according to the signal $x_3$ and are compared with a value stored in the register 252 by the comparator 251. The lesser value from the comparator 251 is stored in the register 252, and a digit number x then obtained is stored in the register 253. After the digit similarity measures of $X_{max}$ are read according to the signal $x_3$, the content of the register 253 represents a digit number of the input pattern. From the digit path memory 24 and the digit recognition category memory 23, $L(X, I)$ and $N(X, I)$ are read and stored in the register 254 and the register 255 in response to address signals $x_4$, $i_2$ corresponding to $x=X$, $i=I$ from the decision control unit 256. The content of the register 255 is generated as a recognized result. Further, the decision control unit 256 issues $x=X-1$, $i=$(value stored in the register 254) to the digit path memory 24 and the digit recognition category memory 23 as address signals $x_4$ and $i_2$, and $L(x, i)$ and $N(x, i)$ on the $(X-1)$-th digit are read and stored in the register 254 and the register 255. Recognized results for the x digits are outputted from a register 255 by repeating the above processing from X to 1 sequentially.

Figure 11A:
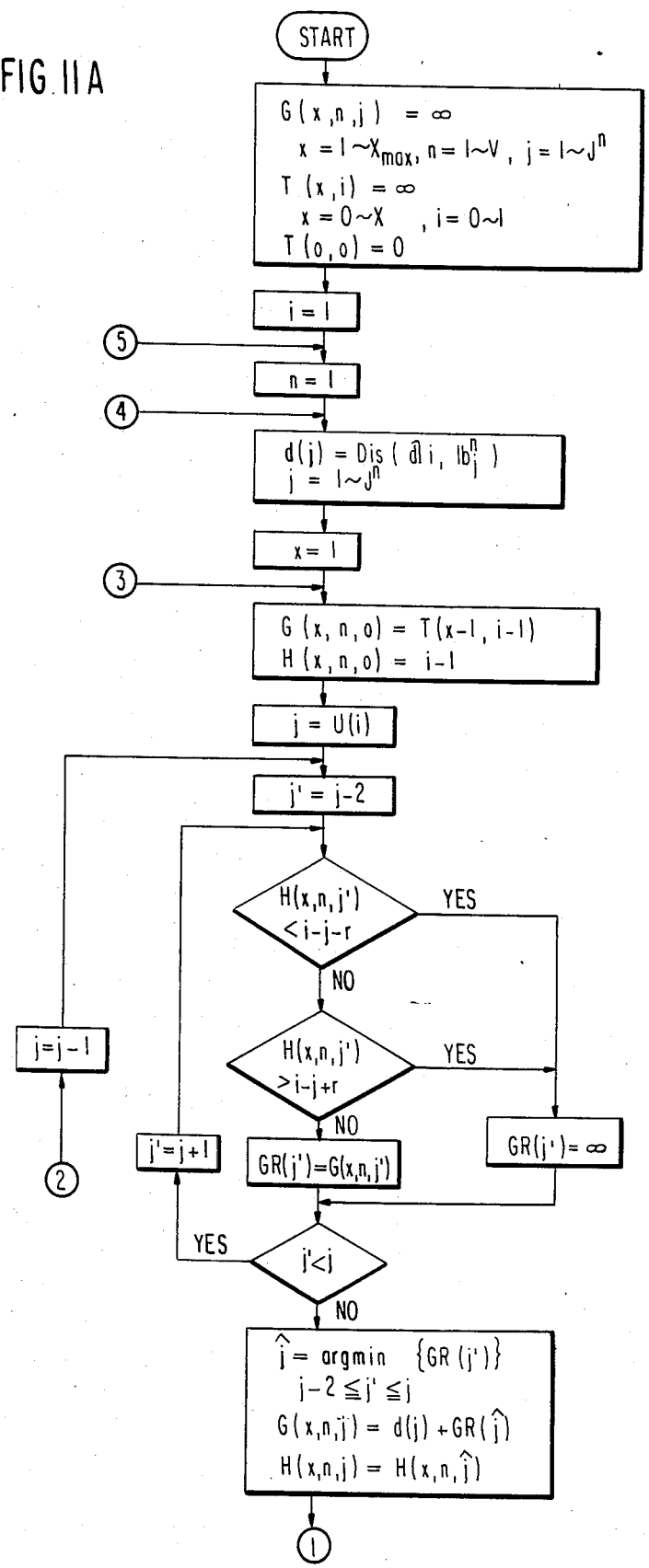
FIGS. 11A and 11B are flowcharts showing the operation of one embodiment of the present invention shown in FIG. 4.
Figure 11B:
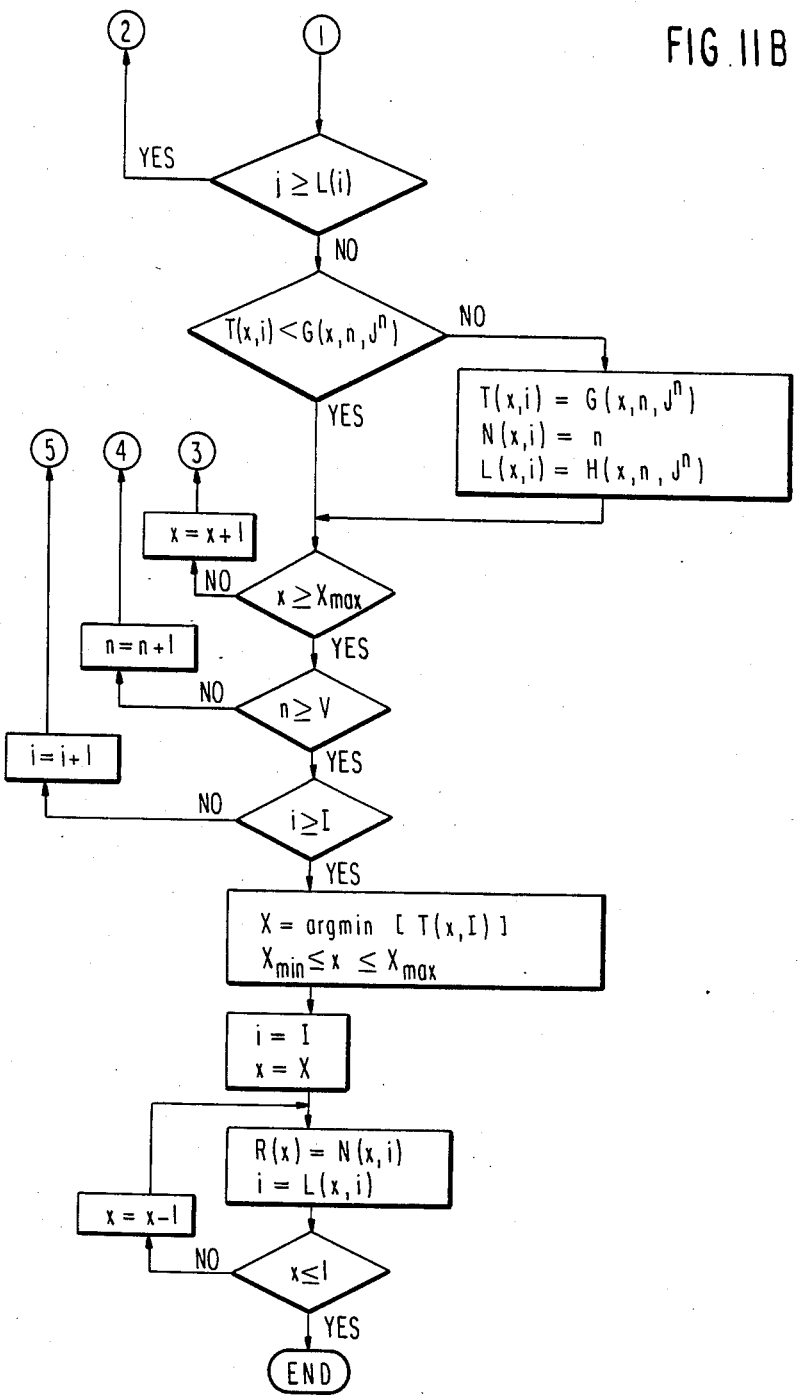

A flowchart for procedures of the processing of the continuous speech recognition system according to the present invention is as shown in FIG. 11A and FIG. 11B.

As described above, in the present invention, the path information of a time point $(i, j)$ on each digit in a DP matching processing is monitored. Therefore, the precision of the window restriction is invariable irrespective of the increase of the number of digits, remarkably reducing the possibility of a false recognition. The present invention is very effective for the aforesaid so-called LB method, especially for a continuous speech recognition system proposed in the aforecited U.S. Ser. No. 447,829, wherein the limitation to the digit number of input words to be recognized is eliminated as shown in the aforesaid embodiment. The theoretical ground of the present embodiment is disclosed in the abovementioned U.S. Ser. No. 447,829. According to this embodiment, the result at one time point i can be calculated as the initial value of the first digit at the following time point $(i+1)$, and thus the similarity measure of the whole can be calculated at only one digit.

A processing representing the fundamental principle of this embodiment will be described. The procedure is then basically the same as that of the system given in FIG. 4, barring no parameter on the digit.

The similarity measure calculation is performed by using an asymptotic expression for Dynamic Programming in the order of the time axis i of an input pattern under initialization.

The initialization comes in $$G(n, j) = \infty \tag{32}$$

$$n = 1 \sim V, j = 1 \sim J^n$$

$$T(O) = 0 \tag{33}$$

$$T(i) = \infty \tag{34}$$

$$i = 1 \sim I$$

A similarity measure calculation in a string vertically and parallel with an axis j at the time point i of an input pattern is performed as follows with initial values as $$G(n, 0) = T(i-1) \tag{35}$$

$$H(n, 0) = i-1 \tag{36}$$

Prior to the execution of an asymptotic similarity measure calculation, such decision by the window restriction as explained with regard to the aforesaid first embodiment is performed. In the same way as aforesaid, GR (j') is set as defined by following expressions (37) and (38) when a path information in the range of $j-2 \leq j' \leq j$ is located outside and inside the window restriction, respectively.

$$GR(j') = \infty \quad (37)$$

$$GR(j') = G(n, j') \quad (38)$$

Thereafter, the similarity measure and the path information are developed according to the following asymptotic expressions.

$$j = \text{argmin } \{GR(j')\} \quad (39)$$

$$G(n, j) = d(j) + GR(j) \quad (40)$$

$$H(n, j) = H(n, j) \quad (41)$$

$j-2 \leq j' \leq j$

After execution of the above asymptotic calculation in a string vertically, a similarity measure $G(n, J^n)$ at an end $J^n$ of the reference word pattern is compared with a digit similarity measure calculated so far. When $G(n, J^n)$ is less than $T(i)$, the similarity measure $G(n, J^n)$ is regarded as a new digit similarity measure $T(i)$, the category n to which the reference word pattern belongs is regarded as a digit recognition category $N(i)$, and the matching path information $H(n, J^n)$ whereby the similarity measure $G(n, J^n)$ is obtained is regarded as a digit path information $L(i)$. Namely, when $T(i) > G(n, J^n)$, the following processings will be carried out.

$$T(i) = G(n, J^n) \quad (42)$$

$$N(i) = n \quad (43)$$

$$L(i) = H(n, J^n) \quad (44)$$

The similarity measure calculation in a string vertically which is carried out as above will be executed for reference word patterns of V.

Next, a similar calculation in a string vertically is executed for each of the reference word patterns of V at the time point i of the input pattern increased by one, thus obtaining the similarity measure as far as the end point I of the input pattern.

Finally, a decision of the input pattern will be made according to the digit path information $L(i)$ and the digit recognition category $N(i)$. The method of decision comprises obtaining first a recognized result $R(X)$ from $L(I)$ at the end I of the input pattern and then obtaining an end point on the $(X-1)$-th digit from a digit path information $L(I)$. A recognized result $N(i_{X-1})$ at the point $L(I)$ which is an end $i_{X-1}$ of the $(X-1)$th digit represents $R(X-1)$ on the $(X-1)$th digit. In brief, the decision will be obtained by the following processes.

$$R(X) = N(i) \quad (45)$$

$$i = L(i) \quad (46)$$

The recognized result $R(x)$ on each digit x is obtained by repeating the above processing.

Figure 12A:
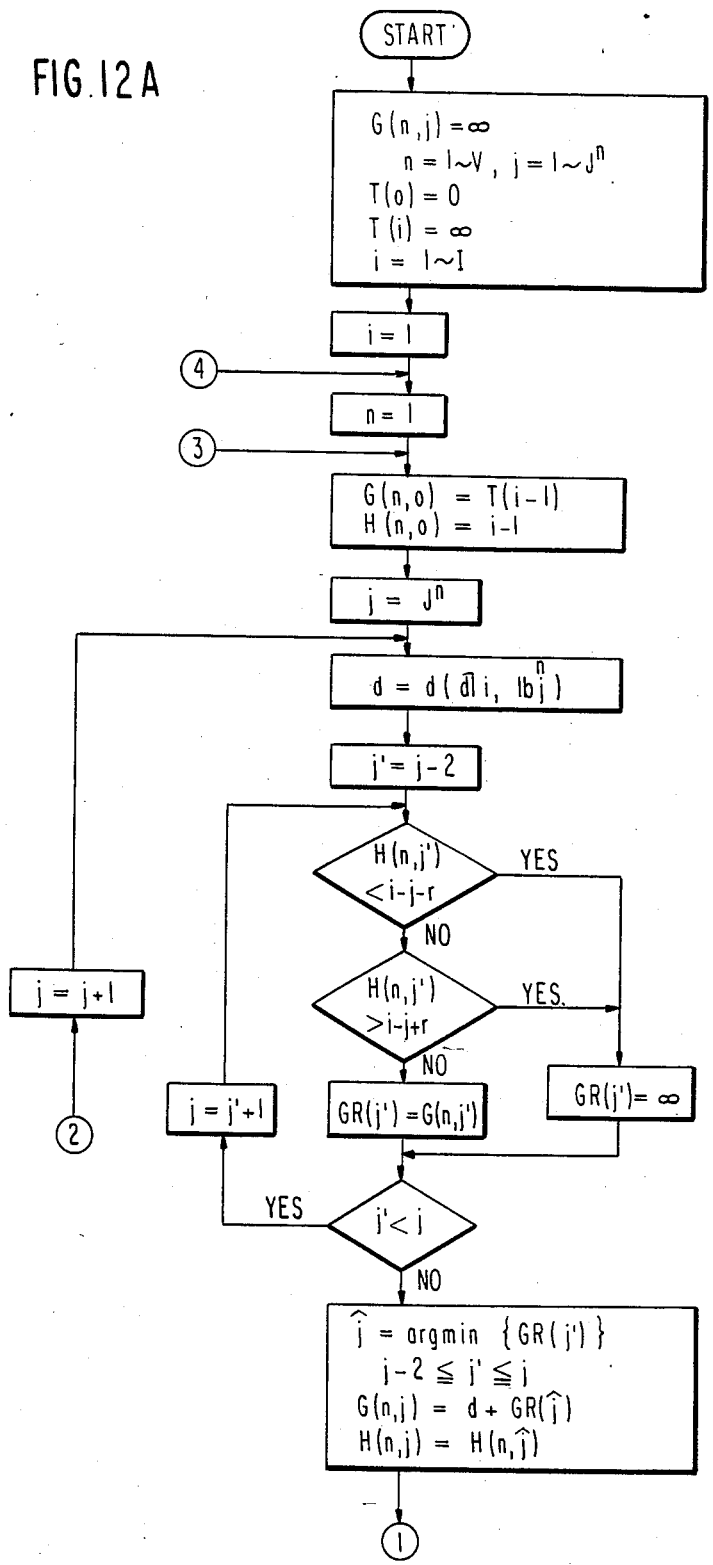
FIGS. 12A and 12B are flowcharts showing the operation of another embodiment of the present invention.
Figure 12:
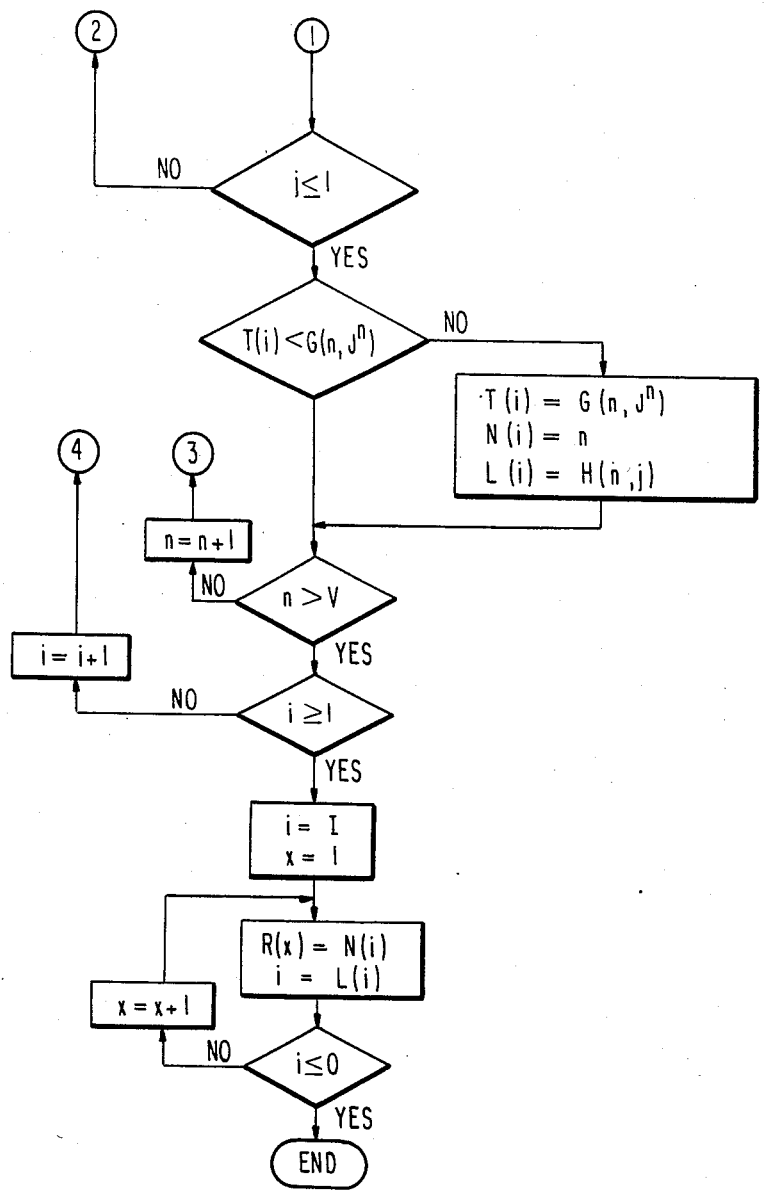

As described, according to the present invention, the similarity measure can be calculated collectively for one digit, instead of carrying out the similarity measure for each digit, by removing the limitation on the digit number of an input pattern, thus decreasing both memory capacity and calculation quantity to $1/X_{max}$ ($X_{max}$ being a maximum digit number of input speech) of the first embodiment. A flowchart for procedures of the processing is as shown in FIG. 12A and FIG. 12B.

A constitution of the continuous speech recognition system according to second embodiment is basically the same as that of FIG. 4, except that the system is free from control by a signal indicating the digit x and therefore the distance memory 16 is not required.

What is claimed is:

1. A continuous recognition system comprising:
   means for developing a similarity measure and a path information at each time point (i,j) to determine a matching path by which an input pattern corresponds with a continuous reference pattern in the order of monotonous increase of i and j based on the similarity measure and path information obtained up to said time point (i,j) by making use of Dynamic Programming, i and j designating time points at time axes of said input pattern and said continuous reference pattern, respectively, said input pattern being given in a time series of feature vectors for an input speech, said continuous reference pattern being given in a time series of feature vectors for connected combinations of a plurality of reference word patterns, said similarity measure being determined by an accumulated distance between said feature vectors of said input pattern and said reference word patterns, and said path information at said time point (i,j) indicating the number of time points where said matching path up to said time point (i,j) intersects said input pattern axis at points corresponding to an initial time point of one of said reference words;
   means for setting the minimum similarity measure obtained for a reference word as an initial value for a next subsequent reference word;
   means for checking whether or not said path information at said time point (i,j) is within a restriction range along said input pattern axis on either side of said time point (i,j), said restriction range being defined for each said time point (i,j) in accordance with at least said path information;
   means for excluding a time point whose path information is outside said restriction range from development of said similarity measure and path information; and
   means for deciding recognition results of said input pattern on the basis of the matching path showing the minimum similarity measure at the end time point of said input pattern.

2. A continuous speech recognition system according to claim 1, wherein said development of said similarity measure and path information is performed at each time point j for each time point i.

3. A continuous speech recognition system according to claim 1, wherein said development of said similarity measure and path information is performed at each time point i for each time point j.

4. A continuous speech recognition system according to claim 1, wherein said development of said similarity measure and path information is performed by changing said time point j in the order of decreasing sequentially one by one.

5. A continuous speech recognition system according to claim 2, wherein said development is performed on one word unit only under nonrestriction on the number of words of said input speech.

6. A continuous speech recognition system according to claim 1, wherein said means for exclusion is means for setting to infinity said similarity measure at a time point outside said window restriction.

7. A continuous speech recognition system according to claim 1, wherein said window restriction is given by the following expression:

$$i-j-r \leq i_s \leq i-j+r$$

where $i_s$ is said path information and r is a predetermined constant.

8. A continuous speech recognition system according to claim 1, wherein a different window restriction is given for each start time point on each word unit.

9. A continuous speech recognition system according to claim 1, wherein a different window restriction is given for each word unit.

10. A continuous recognition system comprising:
comparing means for comparing an input pattern of a plurality of continuously spoken words with a continuous reference pattern of a plurality of reference words and for determining a matching path by which said input pattern corresponds with said reference pattern, said matching path being given by a series of points (i,j), where i and j designate time points along time axes of said input pattern and said continuous reference pattern, respectively, said comparing means, at each potential input pattern word starting point along said matching path, determining if said potential starting point falls within a restriction window range, said system further comprising means for determining the number of times that said matching path crosses time points along said input pattern axis corresponding to start points of said reference pattern words, and means for determining said window restriction at each potential starting point in accordance with the value of said number at said potential starting point.

* * * * *

UNITED STATES PATENT AND TRADEMARK OFFICE
CERTIFICATE OF CORRECTION

PATENT NO. : 4,667,341                                   Page 1 of 2
DATED      : May 19, 1987
INVENTOR(S): WATARI It is certified that error appears in the above-identified patent and that said Letters Patent is hereby corrected as shown below:

Title page:

ASSIGNEE IS OMITTED ON THE FRONT OF PATENT, SHOULD READ
--Nippon Electric Co., Ltd., Tokyo, Japan--.

COLUMN 1, LINE 28   After "pattern" insert --,--;

COLUMN 6, LINE 67   After "constituting" delete "$_i.$" insert --$a_i.$--

COLUMN 8, LINE 22   After "at the" insert --time--;

COLUMN 8, LINE 48   Delete

"$x=1-X_{max}, n-1\sim N, j=1\sim J^n$"

and insert

--$x = 1 - X_{max}, n=1\sim N, j = 1 \sim J^n$--

COLUMN 9, LINE 32   Delete

"$H(x, n, j) = H(x, n, j)$"

and insert

--$H(x, n, j) = H(x, n, \hat{j})$--

COLUMN 9, LINE 56   After "measure T (x, i)" insert --with--

COLUMN 9, LINE 66   After "T(x,i)" delete " - " insert -- = --;

UNITED STATES PATENT AND TRADEMARK OFFICE
CERTIFICATE OF CORRECTION

PATENT NO.  : 4,667,341

DATED       : May 19, 1987

INVENTOR(S) : WATARI

It is certified that error appears in the above-identified patent and that said Letters Patent is hereby corrected as shown below:

COLUMN 10, LINE 45  After "R(x)" delete " - " insert -- = --;

COLUMN 11, LINE 32  After "vector" delete $$f^n(n=1\sim J^n)$$

and insert $$-- \, |b_j^n \, (n = 1 \sim J^n) \, --$$

COLUMN 13, LINE 26  After "L(x,i)" insert --,--;

COLUMN 16, LINE 11  After "to" insert --a--;

COLUMN 16, LINE 40  After "words" delete ":" and insert --;--

Signed and Sealed this

Twenty-first Day of February, 1989

Attest:

DONALD J. QUIGG

Attesting Officer         Commissioner of Patents and Trademarks